United States Patent [19]

Furuya et al.

[11] Patent Number: 5,425,083

[45] Date of Patent: Jun. 13, 1995

[54] CALL CHARGING METHOD IN RADIO TELEPHONE SYSTEM AND RADIO TELEPHONE SYSTEM EMPLOYING THE SAME METHOD

[75] Inventors: Tsuneo Furuya, Miura; Yohichi Ogawa, Kanagawa, both of Japan

[73] Assignee: Hitachi, Ltd., Tokyo, Japan

[21] Appl. No.: 26,762

[22] Filed: Mar. 5, 1993

[30] Foreign Application Priority Data

Apr. 20, 1992 [JP] Japan .................. 4-099288

[51] Int. Cl.⁶ .................. H04M 15/00; H04M 11/00
[52] U.S. Cl. .................. 379/111; 379/58; 379/59; 379/112; 379/113; 379/114; 379/115; 379/133; 379/134
[58] Field of Search .................. 379/58, 59, 111, 112, 379/113, 114, 115, 133, 134

[56] References Cited

U.S. PATENT DOCUMENTS

| | | | |
|---|---|---|---|
| 4,980,907 | 12/1990 | Raith et al. | 379/58 |
| 5,063,591 | 11/1991 | Jodoin | 379/115 |
| 5,109,401 | 4/1992 | Hattori | 379/112 |
| 5,210,787 | 5/1993 | Hayes et al. | 379/59 |
| 5,222,125 | 6/1993 | Creswell et al. | 379/114 |
| 5,233,642 | 8/1993 | Renton | 379/111 |
| 5,251,248 | 10/1993 | Tokunaga | 379/112 |
| 5,255,307 | 10/1993 | Mizikovsky | 379/59 |
| 5,255,308 | 10/1993 | Hashimoto | 379/58 |
| 5,259,017 | 11/1993 | Langmantel | 379/58 |

*Primary Examiner*—Stephen Chin
*Assistant Examiner*—V. Shankar
*Attorney, Agent, or Firm*—Antonelli, Terry, Stout & Kraus

[57] ABSTRACT

In a radio telephone system and a call charging method used in the radio telephone system, when a user of a radio telephone issues a telephone call to a public telephone network by utilizing a radio controller installed in a PBX employed on the premises of a company to which the telephone user does not belong, the PBX reports both terminal number information of the radio telephone and call account information for charging the call account to the terminal to the public telephone network. When the information is received, the public telephone network charges the call account to the radio telephone. If the information is not transmitted from the PBX to the public telephone network, the call account is charged to the call originating line of the PBX.

9 Claims, 6 Drawing Sheets

CALL CHARGING METHOD IN RADIO TELEPHONE SYSTEM AND RADIO TELEPHONE SYSTEM EMPLOYING THE SAME METHOD

BACKGROUND OF THE INVENTION

The present invention generally relates to a call charging (or accounting) method in a radio telephone system accommodating a radio telephone. More specifically, the present invention is directed to such a call charging process that a telephone call is issued to a public telephone network by using a nearby radio controller, even when a user of a radio telephone moves into a home, a street, or on the premises of a firm or company, and in particular when a telephone call is made to the public telephone network (PBX) via a radio controller installed in a private branch exchange on the premises of a company.

In a radio telephone system combining a radio telephone with a radio controller, when the user of the radio telephone issues a telephone call by using the radio controller installed in the PBX on the premises of the company, the call charge process at the side of public telephone network is performed with respect to the telephone calling line of the PBX. As a result, when another user of a radio telephone who is a person other than the subscriber originally present with this company, issues a telephone call to the public telephone network via the radio controller on the premises of the firm, in case that the PBX allows this telephone call, the call charge for this telephone call is charged on the PBX side. As a consequence, it is common to prohibit such an external use of the radio telephone.

On the other hand, as a method for charging the call account to all terminals (telephones), it has been proposed as recited in JP-A-3-91356 that when the telephone calls are issued from the parent station with the different radio telephones, personal numbers are sent from the radio telephones, and the call accounts are charged to the respective personal numbers.

In the above-described prior art, for instance, the call account charged to the terminal which issues the telephone call via a PBX to the public telephone network, is processed in such a manner that either all the call account processings at the side of public telephone network are performed for the telephone call originating lines installed in the PBX of the public telephone network, or all the call accounts are charged to the call originating terminals. As a result, the prior art radio controllers installed in the firm have been so arranged to allow only use of radio telephones which have been previously registered therein. Thus, any person who comes from outside the company must borrow the inter-nal-use radio telephone. Otherwise, another radio controller for the public telephone network must be employed in addition to the existing radio controller in order to accept a telephone call from a radio telephone externally transported or moved in from outside.

SUMMARY OF THE INVENTION

Therefore, an object of the present invention is to provide a call charge method for permitting use of a radio telephone which has not yet been registered in a radio controller, and a radio telephone system.

Another object of the present invention is to provide a call charge method and a radio telephone system employing this call charge method capable of controlling either the charging of a telephone call to a call account of a radio telephone which issues a telephone call via a PBX to a public telephone network, or charging a telephone call to a call account of a call originating line of the PBX.

In accordance with one aspect of the call charge method of the present invention to achieve the above objects, when the externally transported radio telephone originates a call to a public telephone network via the radio controller installed in the company such as the PBX, the PBX reports attribute information such as a terminal number of the radio telephone, or a group number to the public telephone network, or reports both the attribute information corresponding to the terminal and call account information (i.e., information indicating whether or not the call account is charged to each of the call issuing terminals to the public network).

When the externally transported radio telephone originates a call via a radio controller installed in the PBX to the public telephone network, the call account processing for this originating call is carried out at the side of the public telephone network, and a recognition is made that the call account is charged to the terminal which has originated the telephone call.

DESCRIPTION OF THE PREFERRED EMBODIMENTS

Referring now to FIGS. 1 to 6, a radio telephone system to which the present invention has been applied, will be described.

Figure 1:
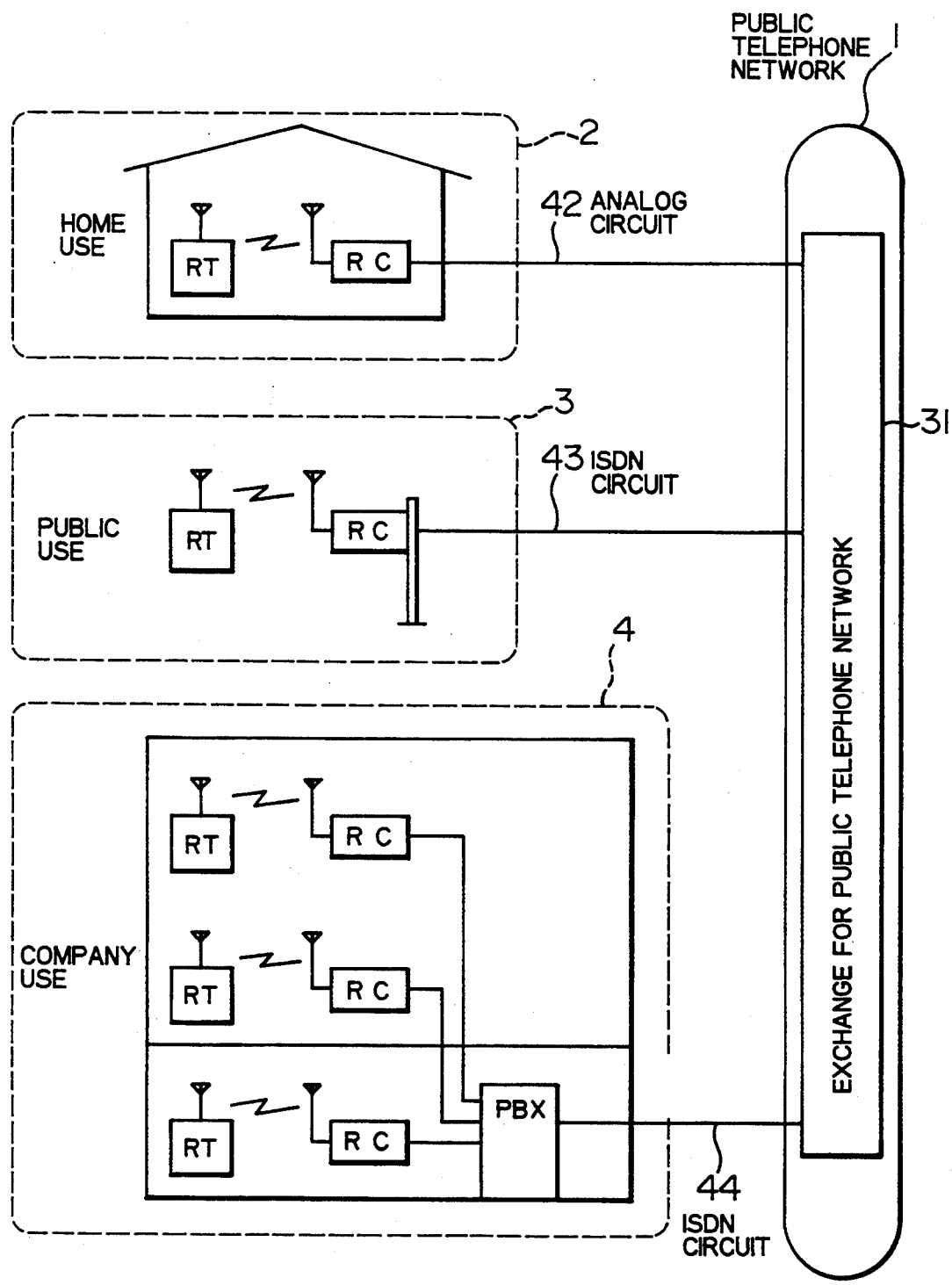
FIG. 1 schematically represents an arrangement of a radio telephone system according to a preferred embodiment of the present invention.

FIG. 1 represents an arrangement of a radio telephone system according to a preferred embodiment of the present invention. There is shown such a condition that radio controllers "RC" and radio telephone "RT" are connected to a public telephone network 1 in accordance with various types of usage. That is, in case of a home use 2, the radio controller RC is provided in the respective homes, and a user of a terminal unit such as a radio telephone "RT" is connected with the public telephone network by using this radio controller "RC". In case of a public use 3, the radio controllers "RC" are installed in public spaces such as a street corner and a station building, and a use of a radio telephone "RT" is connected with the public telephone network by using the radio controller "RC" located near this user. In case of a company use 4, a radio controller "RC" is installed in a PBX (Public branch exchange) of the company, and a user of the radio telephone RT is connected via the radio controller "RC" stored within the PBX to the public telephone network. It should be noted that the user of the radio telephone "RT" can connect with the public telephone network 1 in combination with an arbitrary radio controller RC at any of the described places such as home, public space, and company by using the same radio telephone RT.

It should also be noted that the radio controller RC of the home use 2, the radio controller RC of the public use 3, and the PBX of the company use 4 are connected via an analog circuit 42, an ISDN circuit 43, and another ISDN circuit 44 to a public telephone exchange 31 of the public telephone network 1.

Figure 2:
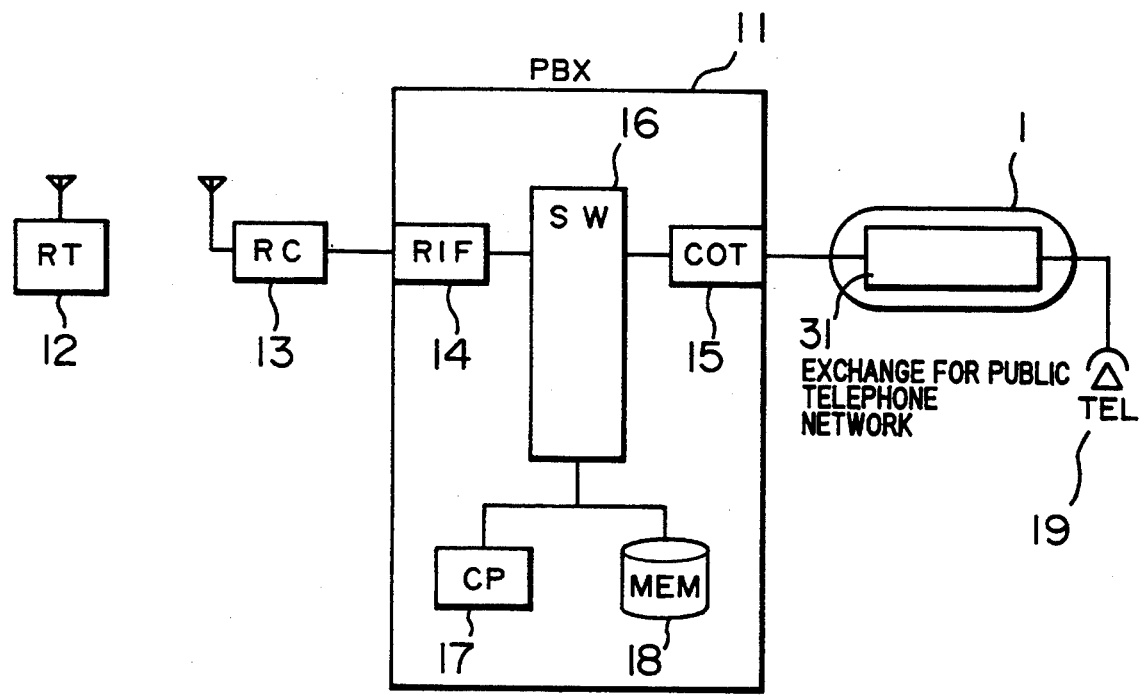
FIG. 2 schematically indicates an arrangement of a radio telephone system used in a firm or company, according to a preferred embodiment of the present invention.

FIG. 2 illustrates an arrangement of a system in a firm or company. In this system, a PBX 11 accomodates a radio telephone RT 12, a radio controller RC 13, a radio terminal interface unit RIF 14, and an office line trunk COT 15. Furthermore, in the PBX 11, a switch SW 16 is controlled by a central controlling unit CP17, and data required for the radio controller are stored in a memory unit MEM 18.

To execute a radio controlling operation in a public network and a company, it is necessary to supervise to which radio controller RC 13, the radio telephone RT 12 is positioned adjacent. In the radio telephone RT 12, an announcement signal derived from the radio controller RC 13 is monitored, so that this radio telephone RT 12 continuously grasps such a fact, i.e., to which radio controller RC 13, this radio telephone RT 12 is positioned adjacent. When this radio telephone enters into a radio covering area of a new radio controller RC 13, a position registration demand is issued to either the public telephone network 1, or the PBX 11. The PBX 11 determines whether the radio telephone RT 12 corresponds to a terminal belonging to the company, or to a terminal externally transported. If the radio telephone corresponds to a terminal externally transported, when the terminal issues the position registration demand to the PBX 11, the PBX 11 registers this position and, at the same time, announces the position registration information a to the public telephone network 1. In case that there is a terminating or arriving call to this radio telephone RT 12, the position registration information reported to the public telephone network 1 is used as information for carrying out a radio connection from the public telephone network 1 via the PBX 11 to the radio telephone RT 12.

The identification whether the radio telephone RT 12 corresponds to one of the terminal belonging to the company, or a terminal externally transported, may be performed by comparing the terminal number or, when this radio telephone RT corresponds to one of plural radio telephones to which the same group number has been attached, the group number with the terminal numbers or the group number of the radio telephone which have been previously registered within the PBX 11. As a result of this identification, if a coincidence is detected, then it may be judged that this terminal corresponds to a radio telephone belonging to the company. Conversely, if a coincidence is not detected, then it may be judged that this terminal corresponds to a radio telephone externally transported.

Figure 3:
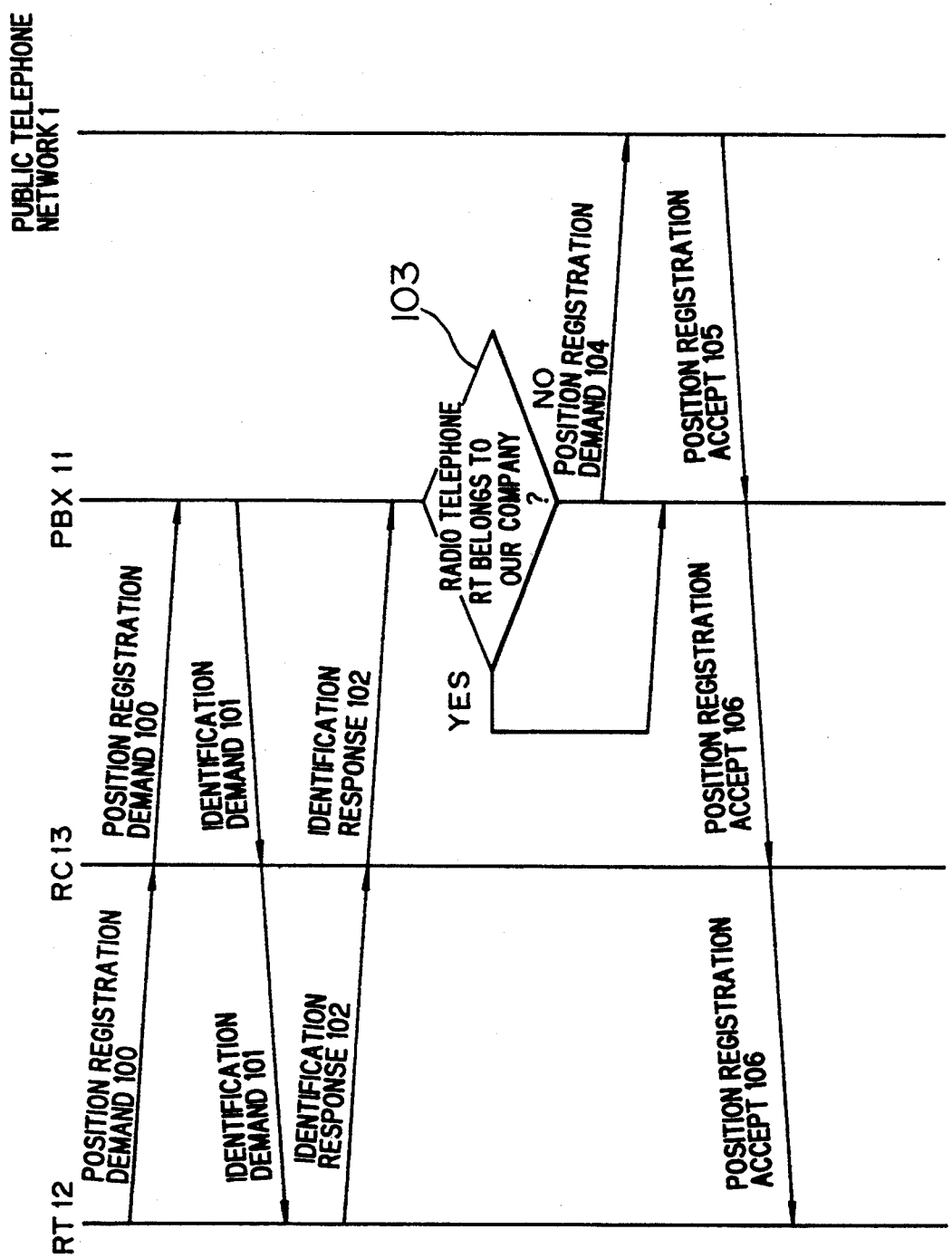
FIG. 3 shows an operation sequence of a position registration according to another preferred embodiment of the present invention.

FIG. 3 represents an operation sequence in the PBX during the position registration. When the radio telephone RT enters into a radio service area for a newly employed radio controller RC 13, a position registration demand signal 100 is transmitted via the radio controller RC 13 to the PBX 11. In the PBX 11, an identification demand signal 101 used for judging whether or not the PBX 11 is allowed to be connected to this radio telephone RT 12, is transmitted to the radio telephone RT 12. Then the PBX 11, judges whether or not this PBX 11 is allowed to be connected to the radio telephone RT 12 in response to an identification respond signal 102. When the connection is allowed, the below-mentioned operation will be performed. At this time, the PBX 11 also judges whether or not the radio telephone RT 12 corresponds to a terminal belonging to the company which employs this PBX 11 (103). If the position registration demand is issued from the radio telephone belonging to this company, then a position registration accept signal 106 is returned to the radio terminal RT 12, so that the position registration operation is completed. Conversely, if the radio telephone RT 12 does not correspond to a terminal belonging to the own company, but to a terminal externally transported, then the position registration is carried out within the PBX 11, and at the same time, a position registration demand signal 104 is transmitted to the public telephone network side in order to request the position registration similarly with respect to the public telephone network. When the position registration is accepted at the public telephone side, a the position registration accept signal 105 is returned, and the PBX confirms this accept signal 105. Thereafter the PBX 11 and then returns a position registration accept signal 106 to the radio telephone RT 12. As a result, since the position registration of the radio telephone RT 12 has been completed with respect to the PBX 11 and the public telephone network 1, when the terminating call is made to the radio telephone RT 12, the terminating connection is carried out based on the position registration information.

Figure 4:
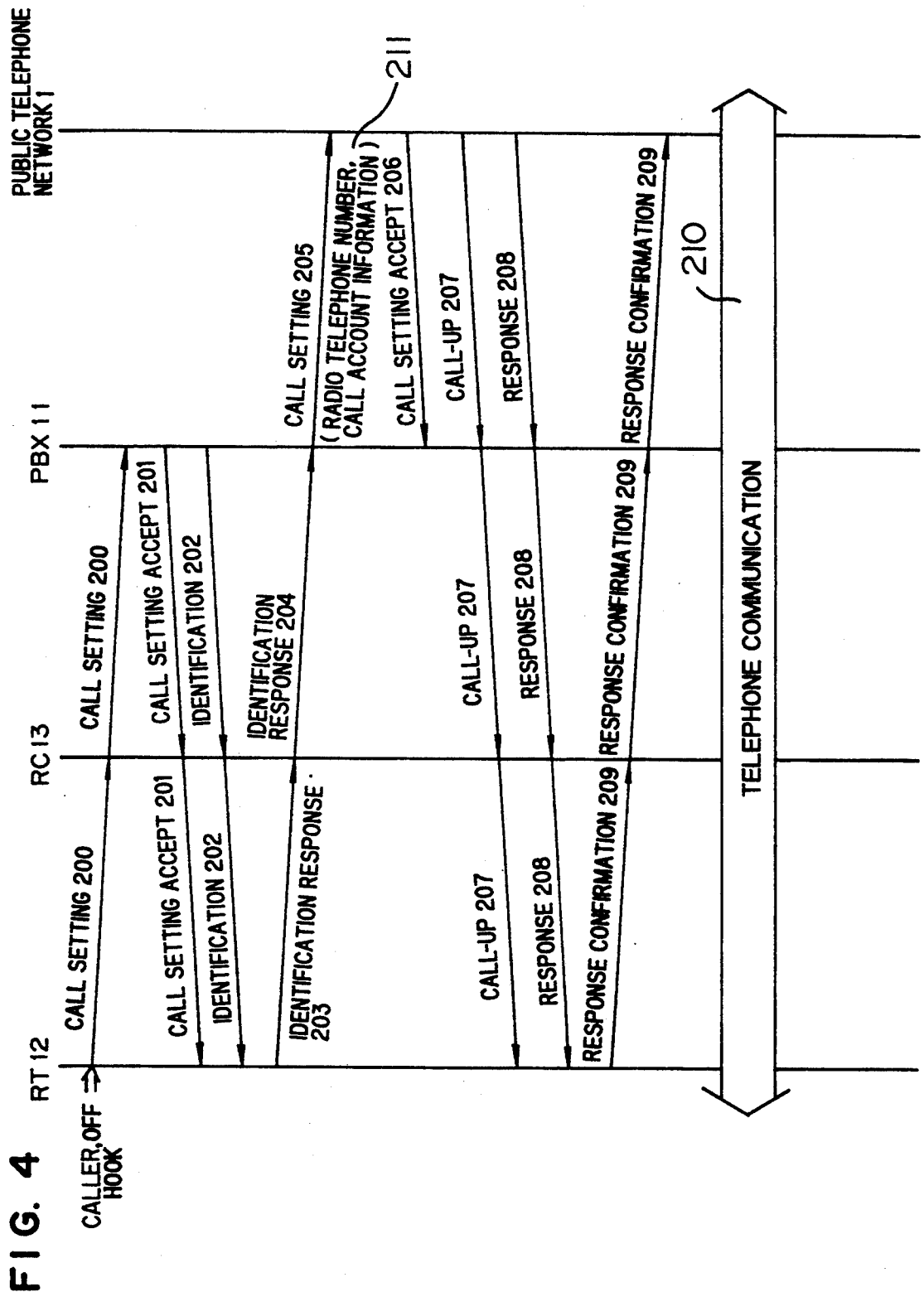
FIG. 4 indicates an operation sequence of an originating connection according to another preferred embodiment of the present invention.

FIG. 4 indicates a sequence of an originating connection. When the radio telephone RT 12 makes a call originating to the public telephone network 1, the radio telephone RT 12 transmits a call setting demand signal 200 to the PBX 11 via the radio controller RC 13. Upon receipt (201) of this call setting demand signal 200, the PBX 11 executes an identification operation (202, 203 and 204) so as to judge whether or not a call is allowed to be issued from the radio telephone RT 12. If there is no problem in the identification result, then the below-mentioned call originating operation is carried out. Information about a person who is called, such as the telephone number, which is required when performing originating call connection, is contained in the call setting signal 200 which is transmitted when a call originating operation is performed at the begining. When this information about the telephone number of the person who is called indicates the originating connection to the public telephone network 1, the PBX 11 transmits a call setting signal 205 to the public telephone network as a call originating demand. At the time, in this PBX 11, depending upon whether a call charge to the originating call directed to this public telephone network 1 is billed to either the call originating trunk of the PBX 11, or a call charge to the radio telephone RT 12 (namely the terminal), information 211 related to the call charging processing is added to the call setting signal 205, or a dedicated signal as independent information is transmitted. In case of FIG. 4, the information 211 is contained in the call setting signal 205.

With respect to the call charging information 211, it is assumed that when the terminal number of the radio telephone RT 12 is transmitted, this is a call charge to the radio telephone RT 12, whereas when no terminal number of the radio telephone RT 12 is transmitted, this is a call charge to the call originating line of the radio telephone RT 12. Alternatively, another call charging method is such that, whenever there is a call originating from the radio telephone RT 12, the terminal number of the radio telephone RT 12 is announced from the PBX 11 to the public telephone network 1, and also information about a decision whether or not a call account is charged to the terminal is reported together with the terminal number. Furthermore, when the radio telephone RT 12 has been transported from other companies, the number of the group belonging to this terminal is transmitted, and thus a call account may be charged to this group, for instance, the call originating trunk of another PBX.

In the public telephone network 1, upon receipt of the call setting signal 205, a telephone connection is established to a person who is called based on the number of the person who is called, which is contained in the call setting demand 205, and at the same time, the call charging process of the caller side is performed in such a manner that a processing corresponding to the call account process demand issued from the PBX 11 is carried out, and a telephone communication is performed in response to the person who is called. More specifically, upon receipt of the call setting demand 205, the public telephone-network I1 returns the call setting accept 206 to the PBX 11, executes a control to call up a person who is called, and, at the same time, sends a call-up 207 via the PBX 11 and radio controller RC 13 to the radio telephone RT 12. If the person who is called makes a response, then the public telephone network 1 sends a response 208 of the person who is called to the PBX 11. When the radio telephone RT 12 recognizes the response 208, a telephone communication 210 is commenced after a response confirmation 209 has been sent via the radio controller RC 12 and the PBX 11 to the public telephone network 1.

Figure 5:
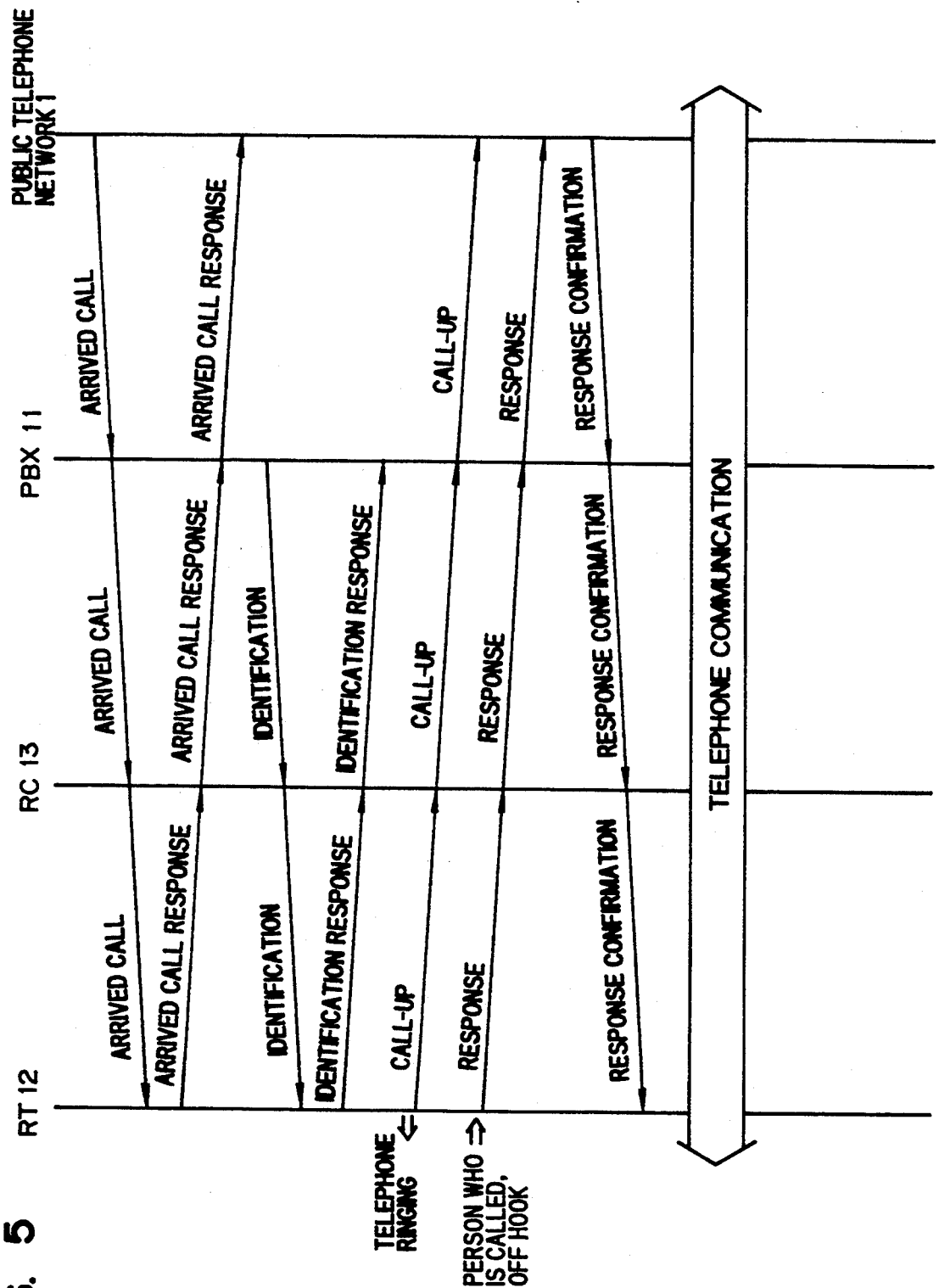
FIG. 5 represents an operation sequence of a terminating connection.

FIG. 5 represents a sequence of a terminating connection. In FIG. 5, when the position of the radio telephone RT 12 has been registered, the relevant radio telephone RT 12 is called by the public telephone network 1. A detailed operation sequence is similar to that of a conventional terminating connection to an internal radio telephone. Since this detailed operation sequence has no direct relationship with the present invention, an explanation thereof is omitted.

Figure 6:
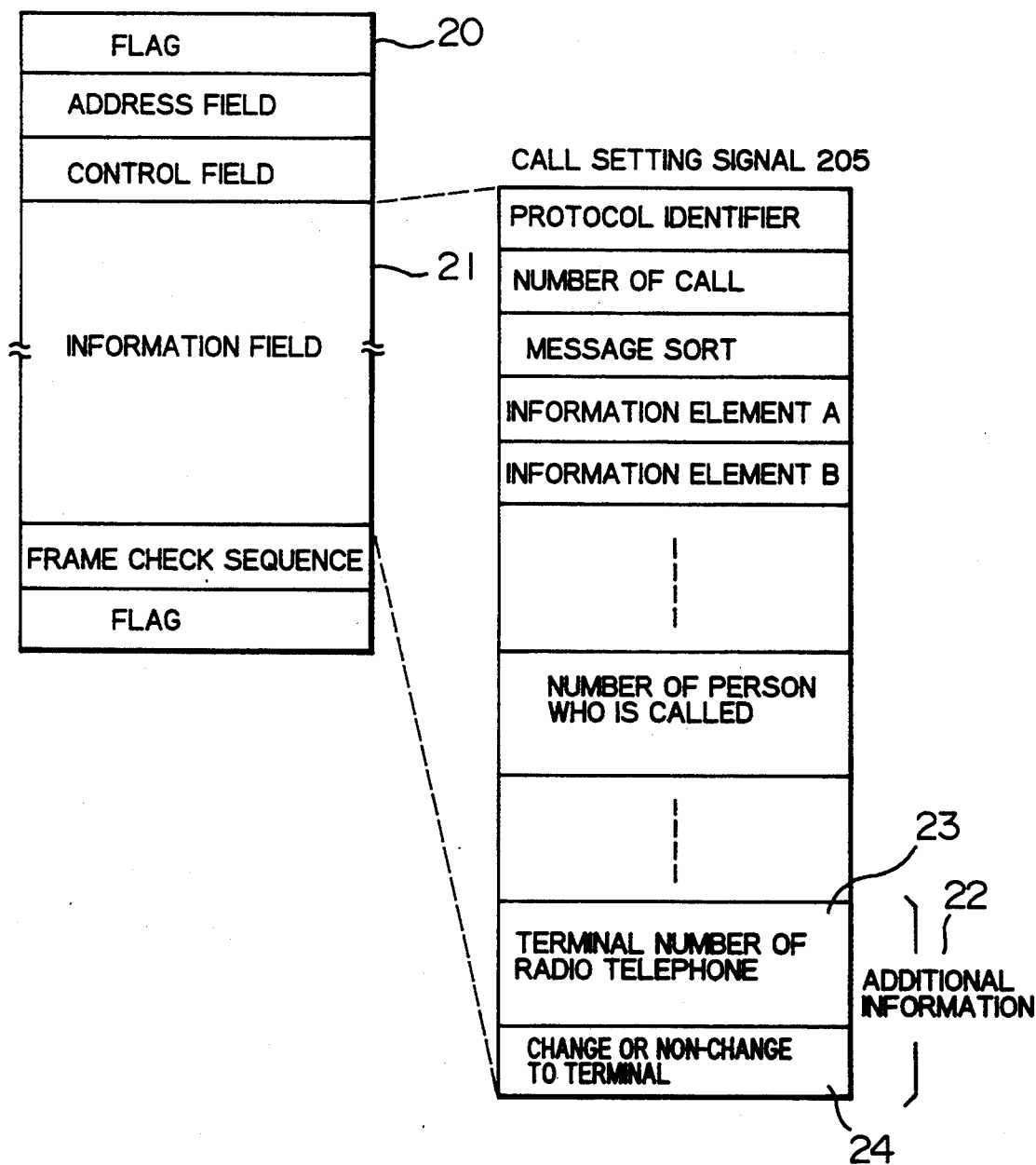
FIG. 6 shows an example of a frame format of a signal used between PBX and a public telephone network.

FIG. 6 represents a frame format 20 of a signal used between the PBX 11 and the public telephone network 1. Various sorts of signals are transmitted/received between the PBX 11 and the public telephone network 1 at the connection stage. The information specific to these various sorts of signals is described in an information field 21. It should be noted that although the signal communicated between the PBX 11 and the public telephone network 1 is intended to utilize an ISDN line, other signal lines capable of transmitting/receiving similar information may be utilized. In FIG. 6, the call setting signal 205 shown in FIG. 4 is contained in the information field 21, and this call setting signal further contains the terminal number 23 of the radio telephone RT and information 24 indicating whether or not the call charge is required for each terminal, if needed, as the additional information 22 about the call changing processing.

In accordance with the present invention, it is possible to control whether a telephone call account when the radio telephone RT issues a telephone call via the PBX to the public telephone network, is charged to the radio telephone RT, or the originating line of the PBX. Accordingly, the radio controller RC installed in the company can be opened for public use. Consequently, the radio controller RC used for the company may also be utilized in addition to the radio controller RC installed for the public telephone network, so that the network of the radio telephone system can be effectively utilized. Also, since the public communication traffic made via the radio controller RC for the firm can be grasped by both of the public telephone network and the PBX, it is possible to establish such a telephone call accounting system that a public communication enterprise may pay a telephone call charge to a firm, depending upon a use amount of the radio controller installed in the firm. It should be noted that although the above description is intended to the relationship between a PBX and a public telephone network, this description may be applied to another relationship between communication networks belonging to different firms.

What is claimed is:

1. A call charging method in a radio telephone system for allowing telephone calls issued from radio telephones via a radio controller installed within a communication network of a first company to a communication network of a second company, said communication network of said second company performs call charging processing, said call charging method comprising the steps of:

upon receipt of a call originating from a radio telephone, identifying, by said communication network of said first company, whether a call account should be charged to said radio telephone or said communication network of said first company;

when said communication network of said first company identifies that said call account should be charged to said radio telephone, transmitting, by said communication network of said first company, call account information to said communication network of said second company;

when said call account information has been received in said communication network of said second company, charging, by said communication network of said second company, said call account to said radio telephone; and when said call account information has not been received in said communication network of said second company, charging, by said communication network of said second company, said call account to said communication network of said first company.

2. A call charging method as claimed in claim 1, wherein said call account information contains a terminal number of said radio telephone, or a group number when said terminal corresponds to one of a group of radio telephones to which the same group number has been assigned.

3. A call charging method in a radio telephone system for allowing telephone calls issued from radio telephones via a radio controller installed within a communication network belonging to a first company to a communication network belonging to a second company, said communication network of said second company performs call charging processing, said call charging method comprising the steps of:

upon receipt of a call originating from a radio telephone, identifying, by said communication network of said first company, whether a call account should be charged to said radio telephone or said communication network of said first company; and transmitting, by said communication network of said first company, to said communication network of said second company identifying information for identifying said radio telephone and call account information for indicating whether said call account for said call is to be charged to said radio telephone or said communication network of said first company;

wherein when said call account information indicates that the call account is to be charged to said radio telephone, said communication network of the second company charges said call account to said radio telephone, and when said call account information indicates that said call account is to be charged to said communication network of said first company, said communication network of said second company charges said call account to said communication network of said first company.

4. A call charging method as claimed in claim 3, wherein said identifying information of said radio telephone contains a terminal number of said radio telephone, or a group number when said terminal corresponds to one of a group of radio telephones to which the same group number has been assigned.

5. In a radio telephone system comprising at least one radio telephone, a plurality of radio controllers for radio-communicating with said radio telephone, a private branch exchange for accommodating a certain number of said plural radio controllers which have been installed on the premises of a company and connected to a public telephone network, and a public telephone exchange for accommodating another certain number of said plural radio controllers which have been installed outside the company and connected to said public telephone network, wherein a user of said radio telephone is connected via a radio controller near a place where said user operates the radio telephone to said public telephone network, a call charge method when the user of said radio telephone issues a telephone call via said private branch exchange to said public telephone network, comprising the steps of:

identifying, by said private branch exchange, whether said radio telephone belongs to said private branch exchange;

reporting, by said private branch exchange, an attribute of said radio telephone to said public telephone network when said radio telephone belongs to said private branch exchange;

charging, by said public telephone network, a call account to said radio telephone when said attribute is reported;

not reporting, by said private branch exchange, the attribute of said radio telephone to said public telephone network when said radio telephone does not belong to said private branch exchange; and charging, by said public telephone network, said call account to said private branch exchange when said attribute is not reported.

6. In a radio telephone system comprising at least one radio telephone, a plurality of radio controllers for radio-communicating with said radio telephone, a private branch exchange for accommodating a certain number of said plural radio controllers which have been installed on the premises of a company and connected to a public telephone network, and a public telephone branch exchange for accommodating another certain number of said plural radio controllers which have been installed outside the company and connected to said public telephone network, wherein a user of said radio telephone is connected via a radio controller near a place where said user operates said radio telephone to said public telephone network, a call charge method when the user of said radio telephone issues a telephone call via said private branch exchange to said public telephone network, comprising the steps of:

identifying, by said private branch exchange, whether said radio telephone belongs to said private branch exchange; and reporting, by said private branch exchange, identifying information for identifying said radio telephone and call account information for designating whether a call account of a telephone call is to be charged to said radio telephone to said public telephone network, wherein said public telephone network charges said call account to said radio telephone when said call account information designates that said call account is to be charged to said radio telephone, and charges said call account to said private branch exchange when said call account information does not designate that said call account is to be charged to said radio telephone.

7. A radio telephone system comprising:

a public telephone network;

a plurality of radio controllers each capable of radio-communicating with an arbitrary radio telephone;

a private branch exchange for accommodating a certain number of said plural radio controllers which have been installed on the premises of a company and connected to said public telephone network; and a public telephone exchange for accommodating another certain number of said plural radio controllers which have been installed outside the company and connected to said public telephone network;

wherein said private branch exchange includes means for identifying whether a radio telephone belongs to said private branch exchange when an arbitrary radio controller accommodated in said private branch exchange receives a telephone call issued from said radio telephone, for producing call account information indicative that a call account is to be charged to said radio telephone when said radio telephone does not belong to said private branch exchange and for sending said call account information to said public telephone network; and wherein said public telephone network charges said call account to said radio telephone when said call account information has been received, and charges said call account to said private branch exchange when said call account information has not been received.

8. A radio telephone system comprising:

a public telephone network;

a plurality of radio controllers each being capable of radio-communicating with an arbitrary radio telephone;

a private branch exchange for accommodating a certain number of said plural radio controllers which have been installed on the premises of a company and connected to said public telephone network; and a public telephone exchange for accommodating another certain number of said plural radio controllers which have been installed outside the company and connected to said public telephone network;

wherein said private branch exchange includes means for identifying whether said radio telephone belongs to said private branch exchange when an arbitrary radio controller of said private branch exchange receives a telephone call issued from a radio telephone, for producing identifying information for identifying said radio telephone and call account information indicative of whether a call account is to be charged to said radio telephone, and for sending both of said information to said public telephone network; and wherein said public telephone network charges said call account to either said radio telephone or said private branch exchange, depending upon said call account information.

9. A radio telephone system as claimed in claim 8, wherein said call account information contains information for charging said call account to said radio telephone, wherein when said call account information indicates to charge said call account to said radio telephone, said public telephone network charges said call account to said radio telephone, and wherein when said call account information does not indicate to charge said call account to said radio telephone, said public telephone network charges said call account to said private branch exchange.

* * * * *